J. A. OLBON.
AUTOMOBILE STEERING POST LOCK.
APPLICATION FILED OCT. 28, 1919. RENEWED SEPT. 30, 1920.
1,360,674.
Patented Nov. 30, 1920.
2 SHEETS—SHEET 2.
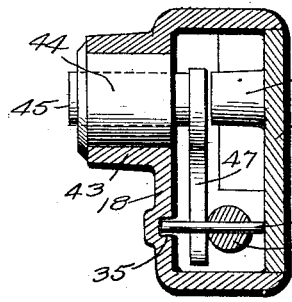
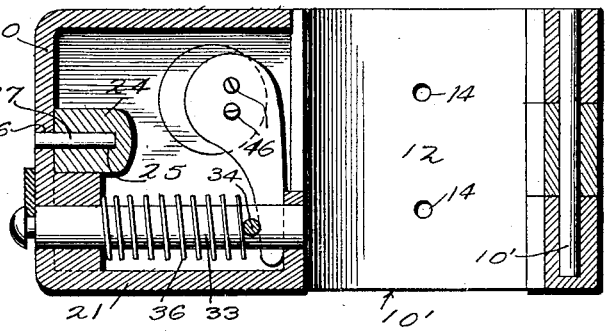
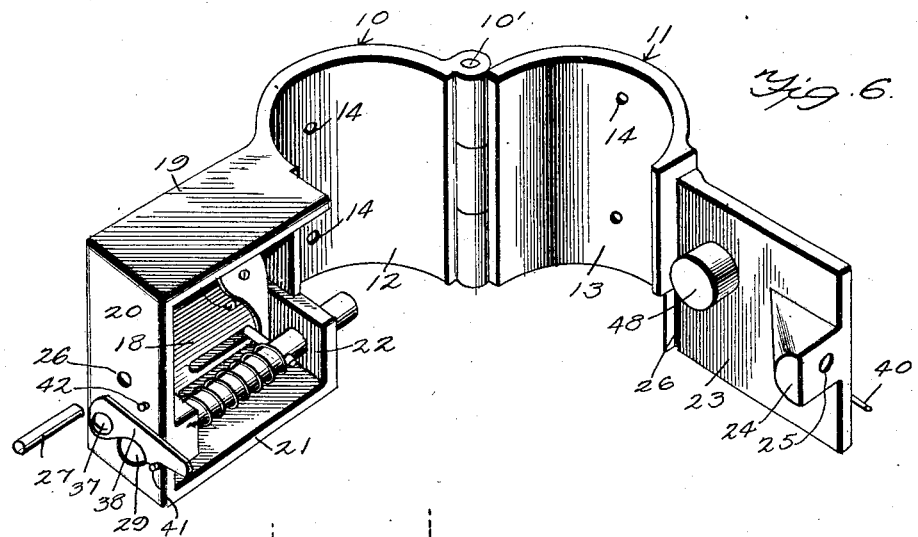
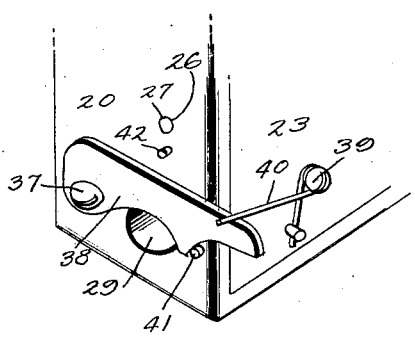
Inventor
John A. Olbon,
By
Attorney

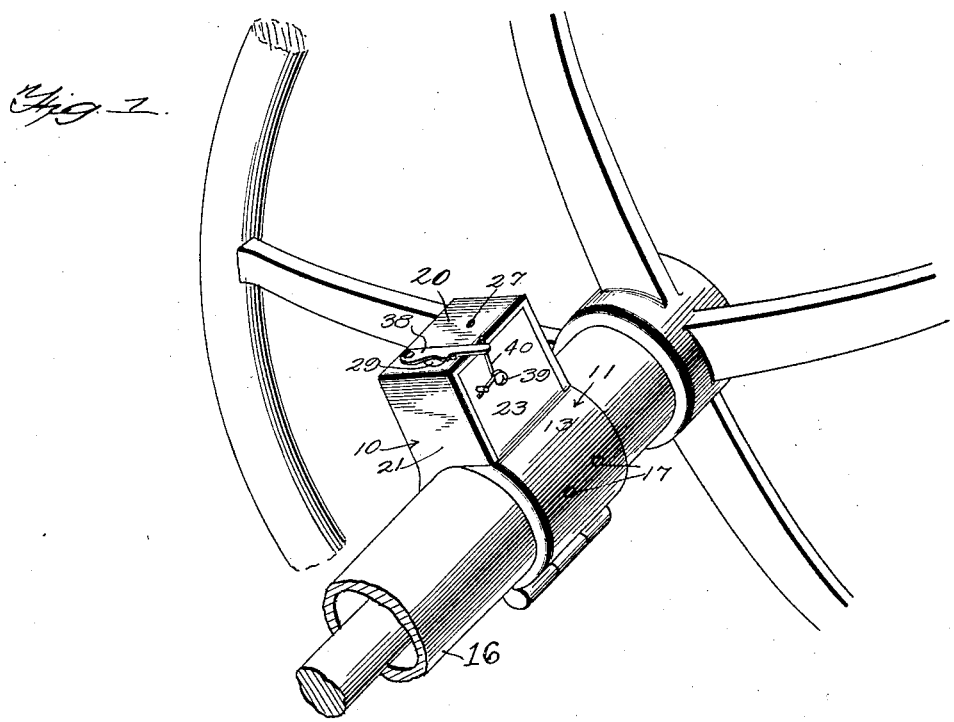
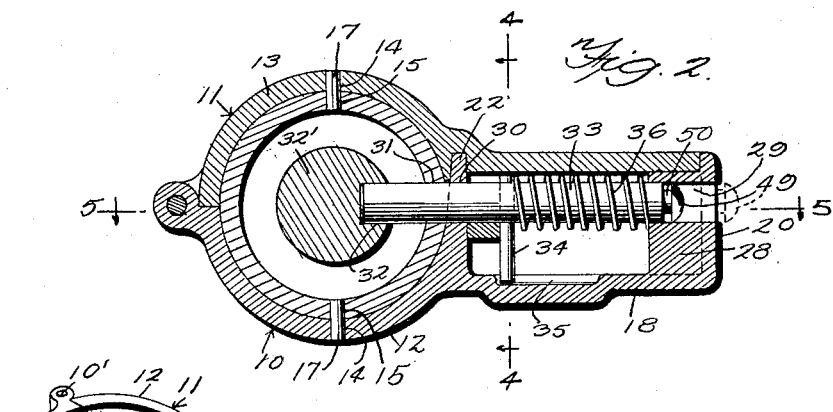
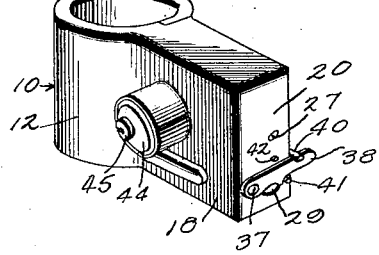

UNITED STATES PATENT OFFICE.

JOHN A. OLBON, OF PATERSON, NEW JERSEY, ASSIGNOR TO AUTO SAFETY DEVICE COMPANY, OF TOWN OF UNION, NEW JERSEY, A CORPORATION OF NEW JERSEY.

AUTOMOBILE-STEERING-POST LOCK.

1,360,674.     Specification of Letters Patent.     Patented Nov. 30, 1920.

Application filed October 28, 1919, Serial No. 334,066. Renewed September 30, 1920. Serial No. 413,898.

*To all whom it may concern:*

Be it known that I, JOHN A. OLBON, a citizen of the United States, residing at Paterson, in the county of Passaic and State of New Jersey, have invented certain new and useful Improvements in Automobile-Steering-Post Locks, of which the following is a specification.

This invention relates to new and useful improvements in automobile steering post locks.

An important object of the invention is to provide a device of the above mentioned character which is of simplified construction and adapted to be applied to and used with the steering gear of an automobile without materially altering the construction thereof.

A further object of the invention is to provide means to insure against accidental locking of the locking part while the machine is in motion.

Other objects and advantages will be apparent throughout the course of the following description.

In the drawings wherein for the purpose of illustration is shown a preferred embodiment of my invention.

Figure 1 is a perspective of my lock applied to the steering post of an automobile.

Fig. 2 is a transverse section taken through the lock.

Fig. 3 is a perspective of the lock detached, the lock being viewed from the opposite side to that shown in Fig. 1.

Fig. 4 is a section on the line 4—4 of Fig. 2.

Fig. 5 is a section on the line 5—5 of Fig. 2.

Fig. 6 is a perspective of the lock casing detached, and showing the halves in the open position, and Fig. 7 is a fragmentary perspective showing the safety latch arrangement.

Referring now more particularly to the drawings the numerals 10 and 11 indicate as a whole the complementary lock casing sections, pivoted together as at 10′. It will be noted that the hinge pivot opening does not extend entirely through the knuckle but is closed at one end to prevent the pivot pin from being driven out and thus allowing of removal of the lock.

The sections 10 and 11 are provided with complementary curved portions 12 and 13 respectively, having apertures 14 formed therein. These apertures 14 are adapted to coact with apertures 15 formed in a stationary steering post casing 16 to receive pins 17. It will be seen that the sections of the casing are held against rotation upon the steering post casing.

The casing section 10 is provided with an outstanding plate 18 having side plates 19, 20, 21 and 22 extending outwardly at right angles thereto and adapted to coact with a plate 23 formed upon the section 11 to form a lock casing proper. The plate 23 is provided with an outstanding lug 24 having an aperture 25 formed therein but not extending entirely therethrough. This aperture 25 is adapted to coact with an aperture 26 formed in the side plate 20 to receive a pin 27. By inspecting Fig. 5, it will be seen that this pin holds the sections of the casing in assembled relation and may not be removed by driving.

The plate 20 is provided with an inwardly extending portion 28 and a bore 29 is formed extending through the plate 20 and the extension 28. A bore 30 is formed in the plate 22 which alines with the bore 29. In placing the casing upon a steering post, the pin 27 is inserted locking the sections of the casing together. A drill is then inserted through the alined bores 29 and 30 and a bore 31 formed through the steering post casing and a recess 32 formed in the steering post 32′, thus assuring of the recess 32 and bore 31 of the steering post casing being properly alined. A bolt 33 is provided with a transverse pin 34, one end of which engages in a groove 35 formed in the plate 18, thus preventing rotation of the bolt. A spring 36 is mounted intermediate the inwardly extending portion 28 and the pin 34 and normally projects the bolt for engagement in the recess 32 of the steering post 32′.

Pivoted adjacent the opening 29 to the plate 20 as at 37 is a latch member 38. Secured as at 39 to the plate 23 is a spring 40 having its free end engaging the latch 38 and forcing it into engagement with a stop 41 mounted upon the plate 20. When in this position the latch 41 covers a portion of the end of the bore 29. A second stop 42 is provided upon the plate 20 to prevent withdrawing of the latch to such an extent as to cause the spring 40 to become disengaged therefrom.

The plate 18 is provided with an outstanding portion 43 having a bore adapted to receive a lock member 44. This lock is provided with a rotatable key operated member 45 having secured to its inner ends by means of screws 46 an operating finger 47 which engages the transverse pin 34 of the bolt 33. It will be seen that rotation of the member withdraws the bolt from engagement in the recess. The plate 23 is provided with an outstanding lug 48 which slidably engages against the heads of the screws 46 and thus prevents loosening thereof.

The bolt 33 is provided upon its rear end with a cam face 49 adapted to engage the latch member 38 and shift the same to allow the body of the bolt to pass through the opening. Adjacent its rear end the bolt is provided with an annular groove 50 in which the latch member seats when the bolt is fully withdrawn. It will be seen that when the bolt is withdrawn it is automatically locked in such withdrawn position preventing accidental relocking thereof.

As many changes are possible in the shape, size, and arrangement of the various parts shown without in any manner departing from the spirit of the invention, I do not limit myself to the specific structure herein described, but may make any such changes without departing from the spirit of the invention, or the scope of the subjoined claims.

What I clam is:

1. In apparatus of the type described, the combination with a tubular casing having a lateral opening, of a steering post rotatable within the casing and provided with a recess adapted to register with said opening, a lock casing secured to said housing and comprising complementary hinged sections, said lock casing having a bore alined with the opening in said tubular casing, a bolt slidably mounted in said bore, resilient means for projecting said bolt into the opening in said housing for engagement with the recess in said steering post, means for withdrawing said bolt, a slot formed in said bolt adjacent the rear end thereof, a plate pivoted upon said casing adjacent said bore, and a spring engaging said plate and forcing it into engagement with the slot in said bolt when the bolt is in withdrawn position.

2. In apparatus of the type described, the combination with a steering post casing having a lateral opening, of a steering post rotatable within the casing and provided with a recess adapted to register with said opening, a lock casing comprising complementary sections hinged at one end, a lug formed upon one of said sections at the end thereof remote from said hinged connection, an opening formed in said lug and extending partially therethrough, an opening formed in the other of said connections adapted to coact with the opening in said lug to receive a pin to secure said sections about said steering post casing, a bore formed in said lock casing and alined with the opening in said steering post casing, a bolt slidably mounted in said bore, resilient means for projecting said bolt into the opening of said housing for engagement with the recess in said steering post, means for withdrawing the bolt, and means for holding said bolt in withdrawn position.

3. In a steering post lock, the combination with a steering post casing having a lateral opening and a steering post rotatable within the casing and provided with a recess adapted to register with said opening, of a lock casing comprising two sections hinged together and having complementary curved portions adapted to surround the steering post casing, a lock casing formed on one of said sections having an open side, a closure plate carried by the other section, a lug formed upon said closure plate adapted to lie within the lock casing when the device is in position, said lug having an opening extending partially therethrough, the lock casing being provided with an opening adapted to register with the opening in the lug, a pin adapted to be inserted in said opening to secure said sections together, a bore formed in the lock casing and alined with the opening in said steering post casing, a bolt slidably mounted in said bore, means for projecting said bolt, means for withdrawing the bolt and means for holding said bolt in withdrawn position.

In testimony whereof I affix my signature in presence of two witnesses.

JOHN A OLBON.

Witnesses:
  T. H. McCauley,
  Wm. G. Mille.